(12) United States Patent
Foletta

(10) Patent No.: US 7,899,201 B2
(45) Date of Patent: *Mar. 1, 2011

(54) SPEAKER WITH ACOUSTIC DAMPED PORT

(75) Inventor: Wayne Stanley Foletta, San Martin, CA (US)

(73) Assignee: Polycom, Inc., Pleasanton, CA (US)

( * ) Notice: Subject to any disclaimer, the term of this patent is extended or adjusted under 35 U.S.C. 154(b) by 1310 days.

This patent is subject to a terminal disclaimer.

(21) Appl. No.: 11/421,022

(22) Filed: May 30, 2006

(65) Prior Publication Data

US 2007/0280499 A1 Dec. 6, 2007

(51) Int. Cl.
*H04R 25/00* (2006.01)
(52) U.S. Cl. .................. 381/353; 381/345; 381/348
(58) Field of Classification Search .......... 381/345, 381/346, 348, 353, 354, 368, 386; 181/141, 181/146, 151, 166, 199; 379/420.02, 420.03, 379/432

See application file for complete search history.

(56) References Cited

U.S. PATENT DOCUMENTS

| | | | | |
|---|---|---|---|---|
| 3,443,660 | A | * | 5/1969 | Olson et al. ............ 381/353 |
| 4,256,198 | A | * | 3/1981 | Kawakami et al. ...... 181/141 |
| 4,550,429 | A | * | 10/1985 | Burbank et al. ......... 381/368 |
| 5,440,645 | A | * | 8/1995 | Freadman ............... 381/386 |
| 2007/0280498 | A1 | * | 12/2007 | Rodman et al. ......... 381/345 |

* cited by examiner

*Primary Examiner* — Huyen D Le
(74) *Attorney, Agent, or Firm* — Wong, Cabello, Lutsch, Rutherford & Brucculeri LLP

(57) ABSTRACT

Systems, methods, and devices for improving speaker performance with an acoustic damped port are disclosed. In accordance with various embodiments of the present invention, a damping material is placed around a vented frame of a speaker driver, and substantially covers or fills the vents of the frame. In some embodiments, the damping material results in improved impedance matching with acoustic delay, without required dimensional tuning (as with conventional ports). In some embodiments, it also reduces the air velocity gradients minimizing higher order frequency distortion components. In some embodiments, the damping material also acts as an absorber of energy by coupling to the sound wave. In some embodiments, low-frequency performance is improved in a small-scale design.

43 Claims, 6 Drawing Sheets

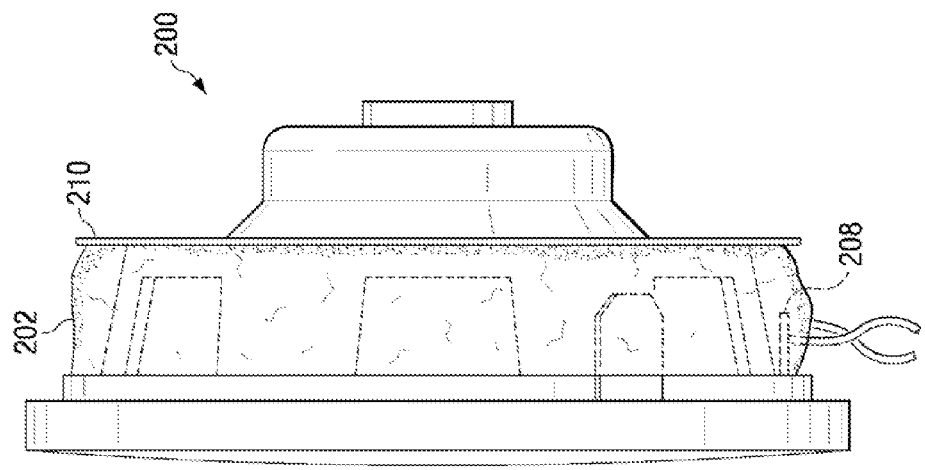
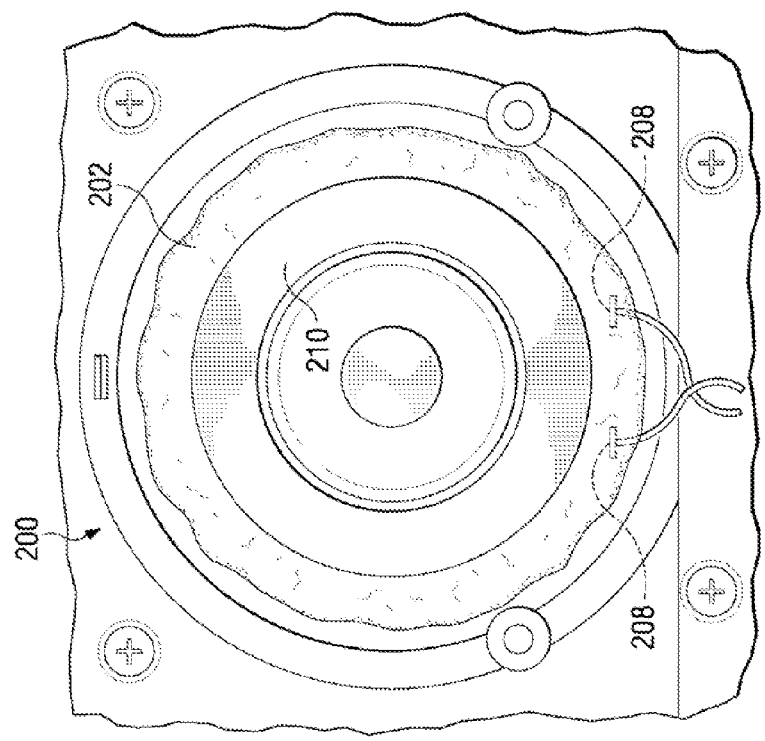
FIG. 2C
FIG. 2B

SPEAKER WITH ACOUSTIC DAMPED PORT

BACKGROUND OF THE INVENTION

1. Field of the Invention

The present invention relates generally to the field of acoustics, and more particularly to systems, methods, and devices for improving speaker performance with an acoustic damped port.

2. Description of the Related Art

The frequency range of human hearing is generally considered to be between approximately 20 Hz and approximately 20 kHz. Human speech typically falls within the range of approximately 100 Hz to approximately 8 kHz. In conventional telephony, the frequency band is truncated outside a range from approximately 300 Hz to approximately 3400 Hz. More recently developed technologies such as VoIP (Voice over Internet Protocol), however, allow for a wider frequency range.

It is difficult to make one speaker driver that reproduces sound waves over the entire frequency range of human hearing. Speaker units therefore typically divide a wide frequency range among multiple drivers. Most high-fidelity speakers include more than one size driver.

To produce low frequencies, a driver typically needs to have a sufficiently large diaphragm and enough mass to resonate at a low frequency. To produce high frequencies, a driver typically needs to have a sufficiently small diaphragm and a low mass. Woofers are the largest drivers, and are designed to produce low-frequency sounds. Tweeters are much smaller units, designed to produce the highest frequencies. A tweeter usually has a sealed back, while a woofer usually has an open back. With a sealed back, the tweeter creates sound waves on the front side only, while a woofer creates sound waves on both its front and back sides. Midrange drivers are typically used in multi-way speakers with three or more driver sizes. Some midrange drivers have open backs, and while some have sealed backs.

A basic prior-art speaker driver 100 with an open back is depicted in FIG. 1. The speaker driver 100 comprises a chassis 102 having a plurality of openings 104. The speaker driver 100 further comprises a diaphragm 106 attached to a suspension 108, which is attached to the chassis 102. The diaphragm 106 is attached to a voice coil 110 which is attached to the chassis 102 by a spider. Each end of the voice coil 110 is coupled to a connection terminal. A dust cap 112 covers a hole in the diaphragm 106.

Speaker enclosures exhibit low-frequency responses and distortion, and are limited by their volume as they interact with the speaker driver. It would be desirable to extend the low-frequency limit and reduce distortion, but this is very limited by the available enclosure volume. This poses a problem when small size is desired.

Different driver designs can help, but are ultimately hampered by the enclosure size. One prior-art method is to fill part or all of the enclosure space with fiberglass or foam, which increases the effective volume by increasing air resistance. Another prior-art method is to use a ported design, which increases the low-frequency performance by adding resonant peaks at the low end. However, each of these methods still has problems as the enclosure sizes get even smaller.

SUMMARY OF THE INVENTION

A need has therefore arisen to provide speaker designs that overcome the limitations of the prior art. Embodiments of the present invention advantageously provide a speaker unit having a compact design without sacrificing sound quality. High-fidelity wideband is made possible in a compact speaker design.

In accordance with one embodiment of the present invention, a damping material is placed around a vented frame of a speaker driver, and substantially covers or fills the vents of the frame. In some embodiments, the damping material results in improved impedance matching with acoustic delay, without required dimensional tuning (as with conventional ports). In some embodiments, it also reduces the air velocity gradients minimizing higher order frequency distortion components. In some embodiments, the damping material also acts as an absorber of energy by coupling to the sound wave. In some embodiments, low-frequency performance is substantially improved in a small-scale design.

In one embodiment of the present invention, a speaker driver is provided which comprises a frame. The frame has a forward portion coupled to a surround, and the surround is coupled to a diaphragm. The frame has a rear portion having one or more vents. A damping material is placed around the rear portion of the frame. The damping material substantially covers or fills each of the one or more vents. The damping material may comprise a natural material, a synthetic material, a combination of natural materials, a combination of synthetic materials, or a combination of natural and synthetic materials. The damping material may be embodied in any of a variety of shapes and configurations, and may substantially conform to the shape and configuration of the rear portion of the frame. The speaker driver may also comprise a regulating member adjacent to the rear portion of the frame. The regulating member causes air to flow from behind the rear portion of the frame through the damping material.

In one embodiment of the present invention, a speaker assembly is provided which comprises a speaker driver with damping material as described above, and an enclosure for housing the speaker driver. The housing may be substantially airtight. The speaker assembly may comprise hardware, software, firmware, or any combination thereof. The speaker assembly may comprise a printed circuit board enclosed in the housing. The speaker assembly may comprise an audio processor. The speaker assembly may further comprise one or more microphones. The speaker assembly may be generally miniaturized, yet deliver high-fidelity wideband audio.

In one embodiment of the present invention, a system for audio conferencing is provided, comprising a conferencing endpoint device and a speaker assembly with damping material as described above. The speaker assembly is communicably coupled to the conferencing endpoint device. The coupling may be wired or wireless.

In one embodiment of the present invention, a method of manufacturing a speaker driver is provided. The method comprises coupling a surround to a diaphragm and coupling the surround to a forward portion of a frame. The frame has a rear portion having one or more vents. The method also comprises placing a damping material around the rear portion of the frame to substantially cover each of the one or more vents. The method may further comprise placing a regulating member adjacent to the rear portion of the frame. The regulating member causes air to flow from behind the rear portion of the frame through the damping material.

In one embodiment of the present invention, a method of manufacturing a speaker assembly is provided. The method comprises placing a damping material around a rear portion of a frame of a speaker driver. The frame has a rear portion having one or more vents. The damping material substantially covers each of the one or more vents. The method also comprises enclosing the speaker driver in a housing. The housing may be substantially airtight.

In one embodiment of the present invention, a method of decreasing speaker self-resonance is provided. The method comprises placing a damping material around a rear portion of a frame of a speaker driver. The frame has a rear portion having one or more vents. The damping material substantially covers each of the one or more vents. The method also comprises enclosing the speaker driver in a housing.

In one embodiment of the present invention, a method of reducing distortion of an acoustic signal output by a speaker driver is provided. The method comprises placing a damping material around a rear portion of a frame of a speaker driver. The frame has a rear portion having one or more vents. The damping material substantially covers each of the one or more vents. The method also comprises enclosing the speaker driver in a housing.

BRIEF DESCRIPTION OF THE DRAWINGS

A better understanding of the invention can be obtained when the following detailed description of the invention is considered in conjunction with the following drawings, in which:

FIG. 2B depicts a bottom plan view of the exemplary speaker driver of FIG. 2A;

FIG. 2C depicts a side view of the exemplary speaker driver of FIG. 2A;

DETAILED DESCRIPTION OF THE INVENTION

Figure 1:
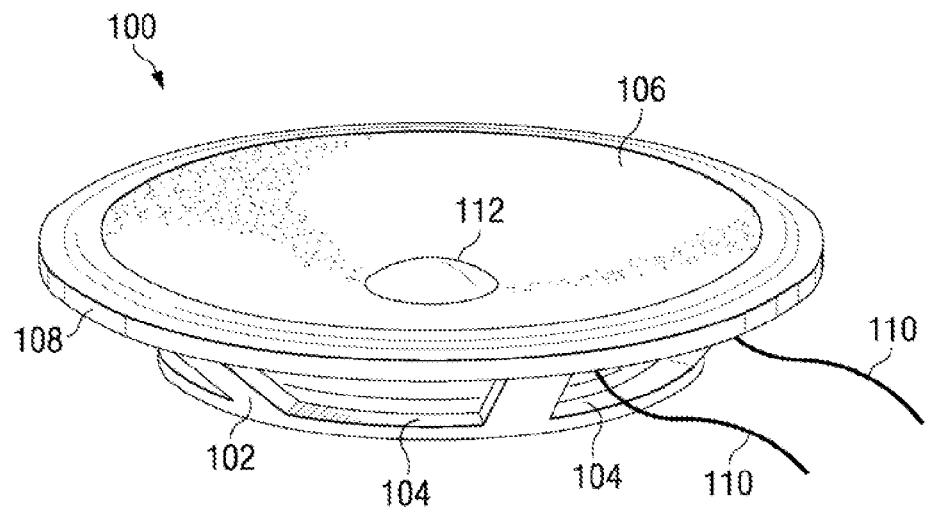
FIG. 1 depicts a perspective view of a prior-art speaker driver.
Figure 2A:
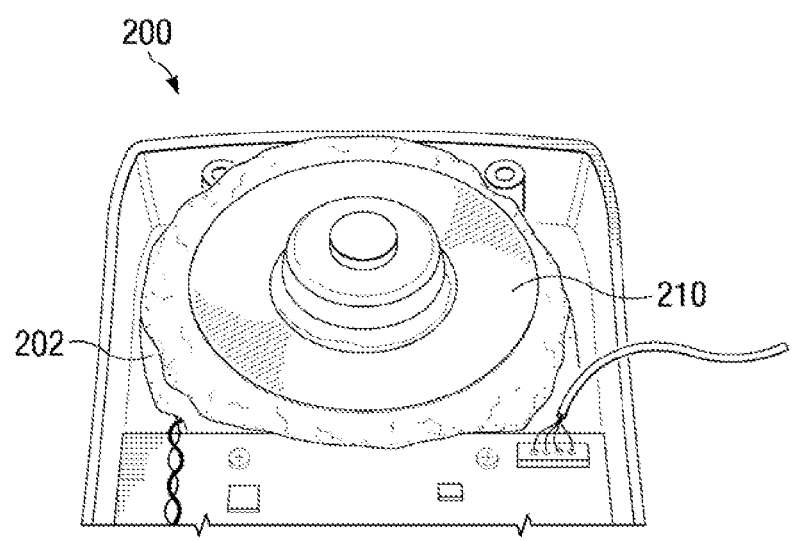
FIG. 2A depicts a perspective view of an exemplary speaker driver with damping material in accordance with various embodiments of the present invention.
Figure 2D:
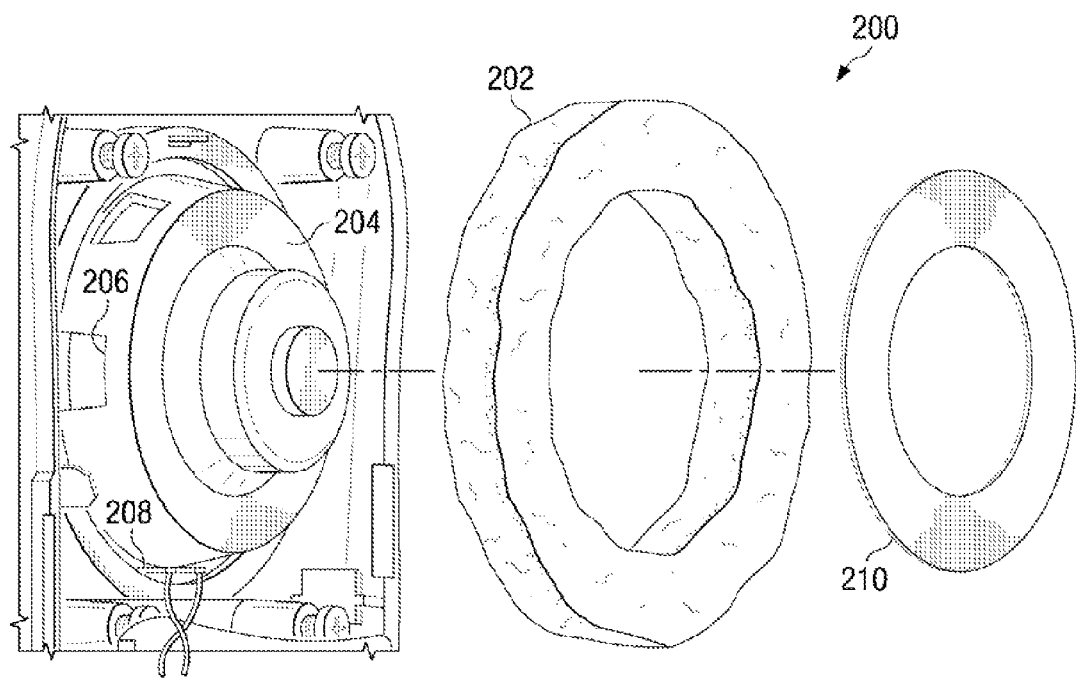
FIG. 2D depicts an exploded view of the exemplary speaker driver of FIG. 2A.

Reference is now made to FIGS. 2A through 2D which depict various views of an exemplary speaker driver 200 with damping material 202 in accordance with various embodiments of the present invention. The speaker driver 200 includes a frame 204 comprising a generally rigid structure. The frame 204 has a forward portion and a rear portion. The forward portion is attached to a surround comprising a rim of compliant material, which is attached to a diaphragm. The rear portion has one or more vents 206 and forms a cage around the diaphragm. The speaker driver 200 also comprises a connection terminal 208 which provides an electrical connection to the voice coil.

The damping material 202 is adjacent to the frame 204 and substantially covers or fills the one or more vents 206. The damping material 202 is in contact with the frame 204 and substantially covers a rear portion of the frame 204. In one embodiment, the damping material 202 is placed on the outside of the rear of the frame 204 and vents 206 to form a generally circular damping ring. In one embodiment, the damping material 202 forms a generally toroidal configuration.

The shape and configuration of the damping material 202 may substantially conform to the shape and configuration of the frame 204. For example, a circular shape may be used, as depicted in FIGS. 2A-2D, and accordingly, the damping material 202 forms a generally circular damping ring. Alternatively, and as a non-limiting example, an elliptical shape may be used. As another non-limiting example, a square shape may be used. As a further non-limiting example, a rectangular shape may be used. Further still, an n-sided-polygon shape may be used. Indeed, a variety of different shapes and configurations are possible.

In one embodiment, the damping material 202 has a configuration generally following the surface of a frustum. For example, the damping material 202 may have a configuration generally similar to the surface of a generally conical frustum (i.e., a tapered cylinder). As another example, the damping material 202 may have a configuration generally similar to the outer surface of a generally pyramidal frustum (i.e., a truncated pyramid) having n trapezoidal faces.

The damping material 202 may be selected from any of a variety of materials. Examples of suitable materials include but are not limited to felt, fiberglass, and foam. The use of natural fibers may be used to provide added resistance to the acoustic energy waves brought about by interlocking fibers' rubbing against each other. Examples of natural fibers include without limitation wool, cotton, silk, linen, cashmere, hemp, ramie, and jute. Alternatively, a man-made or synthetic material having similar characteristics to rough natural fibers may be used. In some embodiments, a blend of two or more materials may be used. The blended materials may be all-natural, all-synthetic, or a combination of natural and synthetic. In one embodiment, a felt material comprising a blend of cotton and wool fibers has been found to be a suitable material.

The density of the damping material 202 may be optimally selected so as to provide a well-matched transmission line. If the density is too high (i.e., the damping material 202 is too tightly packed), then the impedance is too low; if the density is too low (i.e., the damping material 202 is too loosely packed), then the impedance is too high. In one illustrative embodiment, the density of the damping material 202 may be approximately 7 lbs/cu. ft. It should be appreciated, however, that other densities may be used.

The size of the damping material 202 may be selected according to, inter alia, the size of the speaker driver 200 and frame 204. Furthermore, the thickness of the damping material 202 may be subject to slight variation due to the nature of its composition. As a non-limiting example, in one embodiment, using a speaker driver 200 having a frame diameter in the range of approximately 50 mm to approximately 75 mm, the damping material 202 may be selected to be approximately 4 mm thick, approximately 10 mm wide, and approximately 150 mm in circumference. It should be appreciated, however, that other dimensions may be used.

The damping material 202 as described herein results in improved impedance matching with acoustic delay, without required dimensional tuning (as with conventional ports). It also reduces the air velocity gradients minimizing higher order frequency distortion components. The damping material 202 also acts as an absorber of energy by coupling to the sound wave.

In some embodiments, a regulating member 210 may be placed adjacent to a back side of the speaker frame 204 to confine the port and force air from the back side of the speaker frame 204 to travel radially through the damping material 202 rather than around it. The regulating member 210 may be attached to the back side of the speaker frame 204 by using an adhesive.

In one embodiment, the regulating member 210 may comprise cardstock paper. Alternatively, and as a non-limiting example, the regulating member 210 may comprise felt. As another non-limiting example, the regulating member 210 may comprise plastic. Other suitable materials may be used which function to regulate the air flow.

In one embodiment, the regulating member 210 may be generally annular, as depicted in FIGS. 2A-2D. The diameter of the regulating member 210 may be greater than the diameter of the back side of the frame 204 to which it is adjacent. In another embodiment, and as a non-limiting example, an elliptical shape may be used. As another non-limiting example, a square shape may be used. As a further non-limiting example, a rectangular shape may be used. Further still, an n-sided-polygon shape may be used. Indeed, a variety of different shapes and configurations are possible.

Figure 3B:
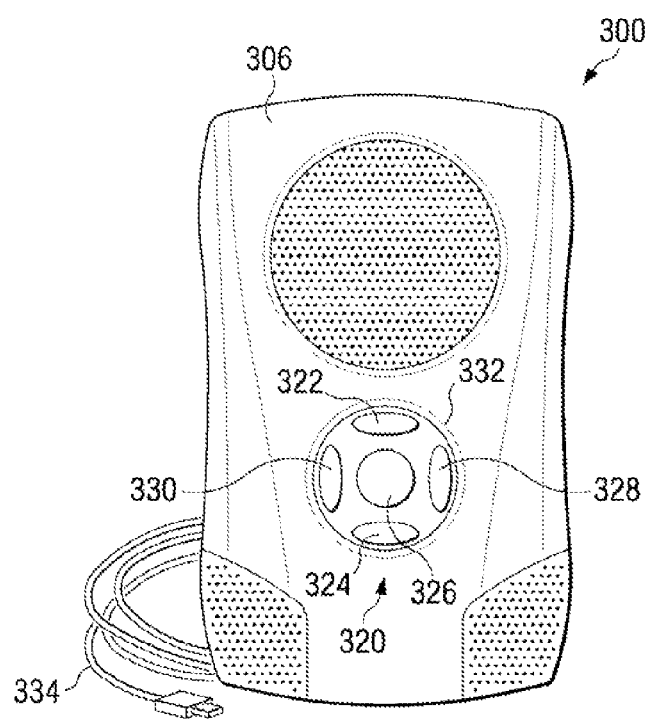
FIG. 3B depicts a front elevational view of the exemplary speaker assembly of FIG. 3A.
Figure 3A:
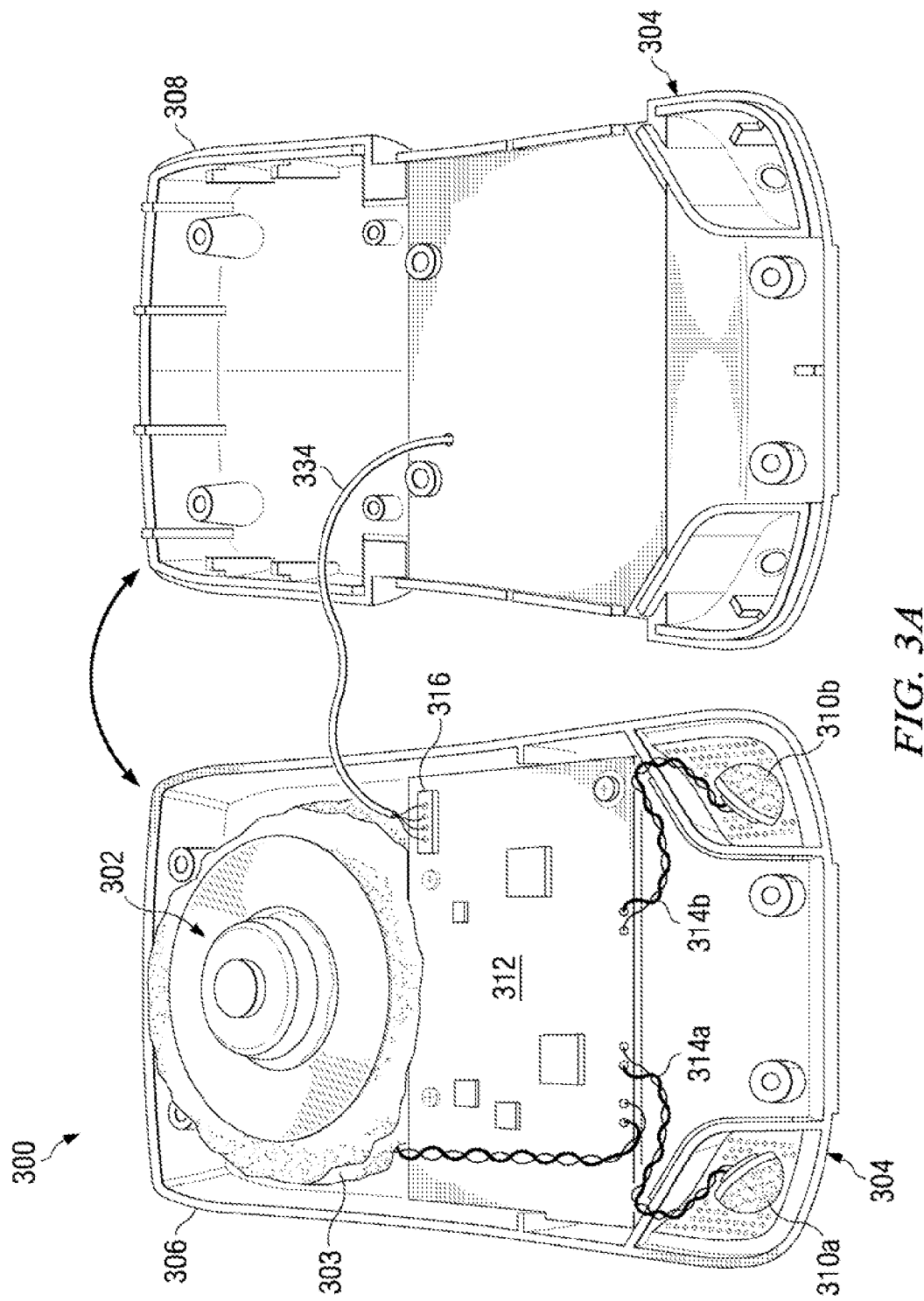
FIG. 3A depicts a perspective view of an exemplary speaker assembly with damping material (depicted unassembled) in accordance with various embodiments of the present invention.

Reference is now made to FIG. 3A which depicts a perspective view of an exemplary speaker assembly 300 (shown unassembled for purposes of illustration), in accordance with various embodiments of the present invention. The speaker assembly 300 includes a speaker driver 302 which may substantially comprise the components of speaker driver 200 which is shown in FIGS. 2A-2D and described above. For example, speaker driver 302 includes damping material 303 placed around a vented frame.

When assembled, speaker driver 302 is housed in a substantially airtight enclosure 304. Enclosure 304 may comprise a front portion 306 and a rear portion 308. When assembled, the front portion 306 and rear portion 308 may be held together by one or more fastening members such as screws (not shown). An O-ring seal may be used at the joint between front portion 306 and rear portion 308 to provide a substantially airtight seal. In accordance with one embodiment, a front elevational view of the speaker assembly 300 is depicted in FIG. 3B.

In the present embodiment, enclosure 304 is not filled with fiberglass or foam or other filling material. Rather, enclosure 304 includes spaces of air surrounding damping material 303.

In accordance with some embodiments, the size of speaker assembly 300 is relatively small. The small size allows for ease of portability. For example, in one embodiment, the speaker assembly 300 is of a size comparable to a pocket-sized electronic device, and has an enclosure 304 with dimensions of at least approximately 5.25 inches in length, at least approximately 3.24 inches in width, and at least approximately 0.85 inch in height. The total internal volume of the entire sealed speaker assembly 300 in the present example is approximately 6.5 cu. in. It should be appreciated, however, that other dimensions and volumes may be used.

Figure 5:
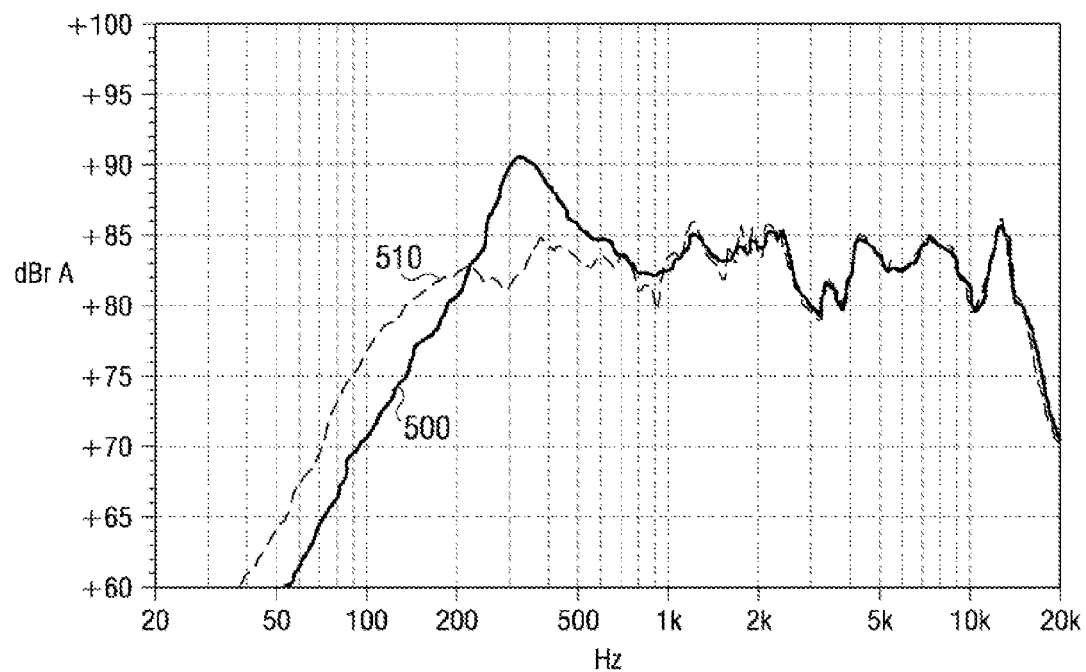
FIG. 5 depicts an exemplary frequency response curve.

Thus, a compact design is made possible that improves low-frequency performance. In one embodiment, the speaker assembly 300 delivers high-fidelity wideband audio, with a frequency response of approximately 300 Hz to approximately 19 kHz. A graphical representation of an exemplary frequency response for two different scenarios is depicted in FIG. 5. Curve 500 represents a response curve given by a 50 mm speaker in an enclosure of 6.5 cu. in, without any damping material. The use of damping material on the same speaker and same enclosure yields response curve 510. As shown in FIG. 5, output is improved at low frequencies by using the damping material, and the response is maximally flat at approximately 200 Hz, without resorting to amplifier compensation techniques.

Figure 6:
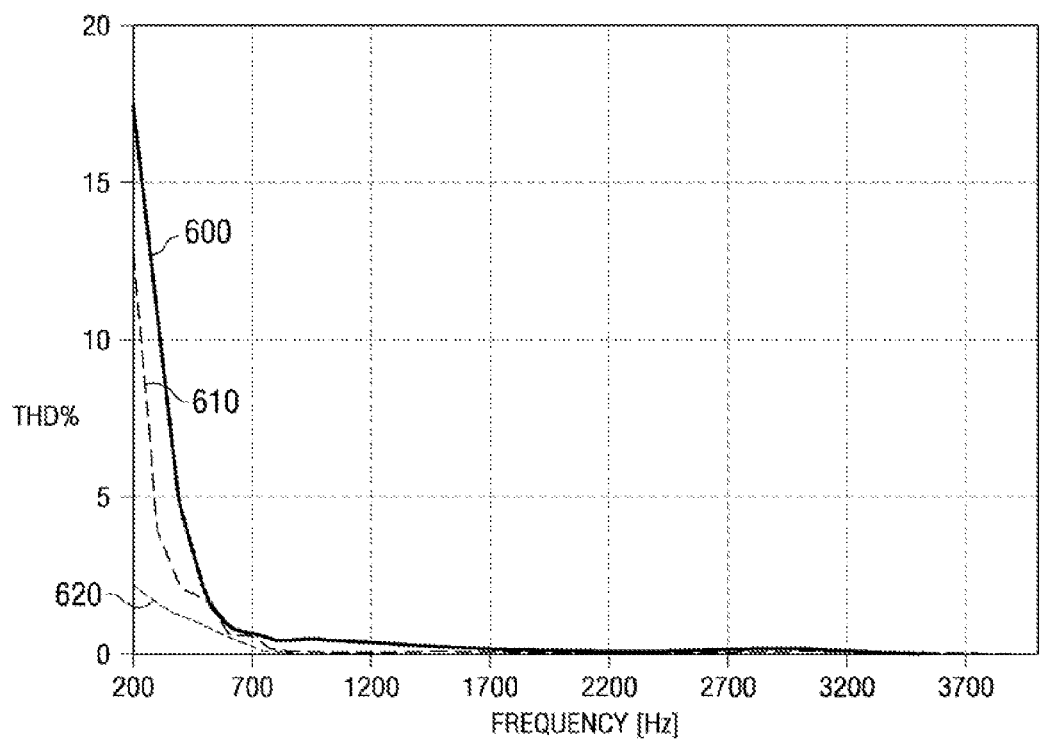
FIG. 6 depicts an exemplary plot of total harmonic distortion vs. frequency.

FIG. 6 depicts a graphical representation of total harmonic distortion ("THD") vs. frequency, for three different exemplary scenarios. Curve 600 represents the THD when no damping material is used. Curve 610 represents the THD when using a man-made damping material. Curve 620 represents the THD when using a natural damping material. Thus, the THD can be reduced by approximately one-half to one-fourth in the present example.

Referring again to FIGS. 3A and 3B, the speaker assembly 300 may further comprise one or more microphones 310a and 310b. In one embodiment, each of the one or more microphones 310a and 310b comprises a gated microphone with intelligent switching. In one embodiment, each of the one or more microphones 310a and 310b comprises a cardioid microphone with a pick-up range of approximately 200 Hz to approximately 20 kHz. Accordingly, such an embodiment is well-suited for audio conferencing applications. In one embodiment, each of the one or more microphones 310a and 310b can pick up audio from a distance of at least approximately seven feet, which is suitable for audio conferencing with one-on-one as well as group conversations.

The speaker assembly 300 may further comprise a printed circuit board 312 housed within enclosure 304. A connection terminal of the speaker driver 302 is coupled to printed circuit board 312. Microphone 310a is coupled to printed circuit board 312 via one or more wires 314a. Microphone 310b is coupled to printed circuit board 312 via one or more wires 314b. The speaker driver 302, microphone 310a, and microphone 310b may be coupled to an input/output (I/O) interface which is coupled to a processor on the printed circuit board 312. The I/O interface may perform analog-to-digital conversion, digital-to-analog conversion, and other signal processing tasks in connection with audio received from the one or more microphones 310a and 310b and audio sent to speaker driver 302.

The printed circuit board 312 may include additional components such as hardware, software, firmware, or any combination thereof. For example, the components may comprise an audio processor or firmware for performing automatic gain control. The components may comprise an audio processor or firmware for automatically reducing or eliminating echoes and feedback. The components may comprise an audio processor or firmware for enabling full-duplex audio.

The printed circuit board 312 may further comprise an interface 316 to an external device such as a computer. Accordingly, the speaker assembly 300 may be used as a computer peripheral, for delivering high-quality voice, music, and/or other audio. Furthermore, the speaker assembly 300, with one or more microphones 310a and 310b, may be used as a speakerphone unit for audio conferencing, including VoIP conferencing. The interface 316 may comprise an interface for a wired or a wireless connection to the external device. In one embodiment, the interface 316 may comprise a USB (Universal Serial Bus)-compliant interface to a USB cable 334. Power may be provided to the speaker assembly 300 via the USB cable. In alternative embodiments, power may be supplied to the speaker assembly 300 by a power supply.

The printed circuit board 312 may be coupled to a user interface for controlling various functions of the speaker assembly 300. An exemplary embodiment of the user interface is depicted in FIG. 3B. The user interface 320 of FIG. 3B may provide speaker volume control, by way of, for example, a button 322 which may be pressed to increase speaker volume and a button 324 which may be pressed to decrease speaker volume.

The user interface 320 may provide a muting function by way of, for example, a button 326 which may be pressed to enable (or disable), muting of each of the one or more microphones 310a and 310b. The button 326 may also be used to mute the speaker, in some embodiments. The user interface 320 may include a button 328 which may be pressed to receive (or hang up) a call.

The user interface 320 may include a button 330 which may be pressed to launch a software application on the computer or other external device. The software application may comprise an application for enabling audio conferencing. For example, the application may comprise an application that enables VoIP calls. Thus, in some embodiments, speaker assembly 300 functions as part of a speakerphone.

The user interface 320 may comprise an indicator 332 for indicating status of a call. For example, the indicator 332 may comprise an LED indicator which is lit during a call. In one embodiment, the indicator 332 may be lit in one color (such as red, for example) during a call when mute is enabled, and may be lit in another color (such as green, for example) during a call when mute is disabled.

Figure 4:
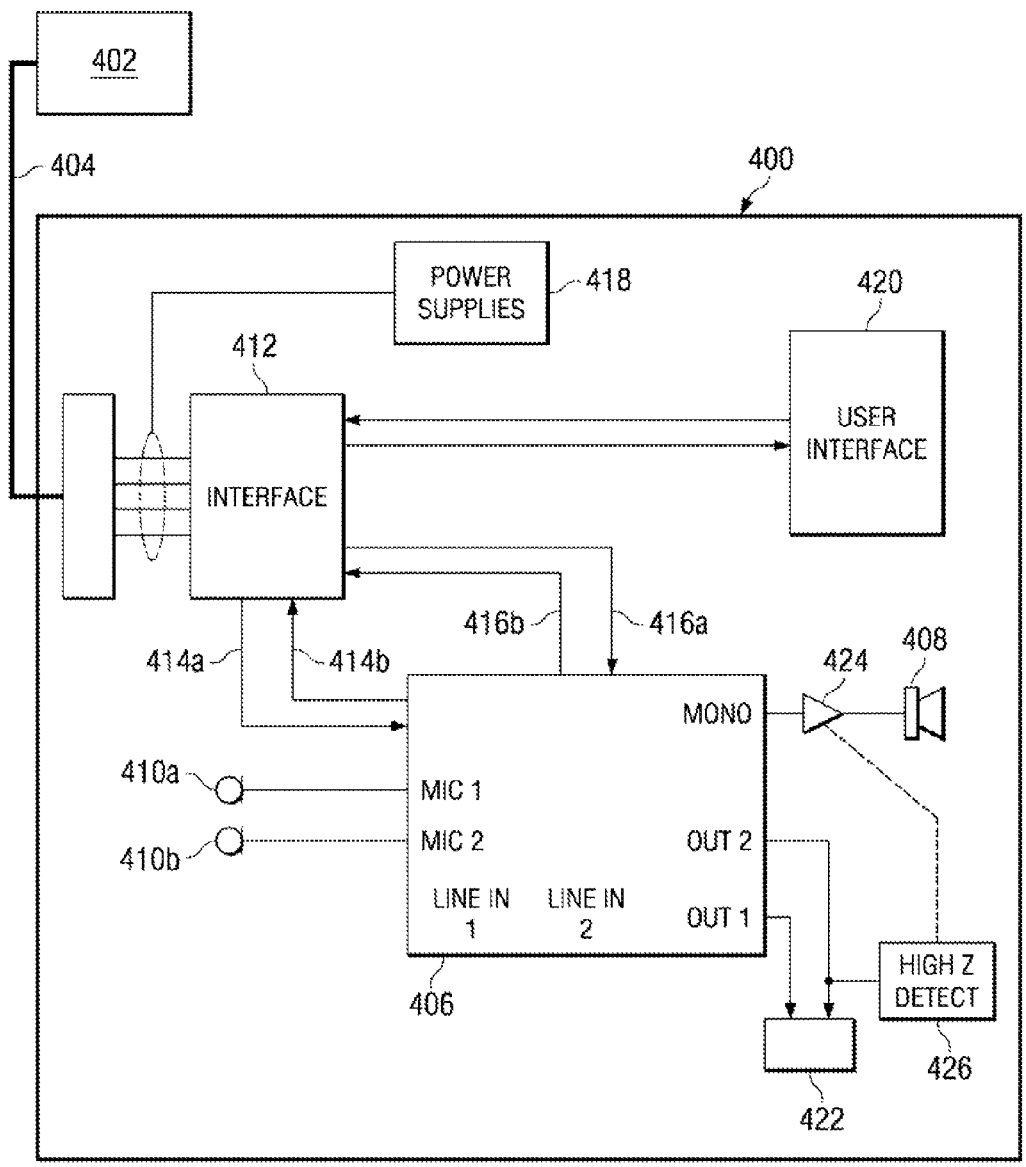
FIG. 4 depicts a block diagram of an exemplary system for audio conferencing in accordance with various embodiments of the present invention.

Reference is now made to FIG. 4 which depicts an exemplary block diagram of a system for audio conferencing, in accordance with various embodiments of the present invention. The system comprises a speaker assembly 400, which may resemble speaker assembly 300 in many respects. The system further comprises a conferencing endpoint device 402. The conferencing endpoint device may comprise, for example, a device capable of receiving and/or sending VoIP calls, such as a computer or laptop, IP phone, or other device. The speaker assembly 400 is communicably coupled to the conferencing endpoint device 402 via a connection 404, which may be wired or wireless. In one embodiment, the connection 404 may comprise a USB cable.

The speaker assembly 400 comprises an audio processor 406. An example of a suitable audio processor 406 is the AK4569 CODEC manufactured by Asahi-Kasei. The audio processor 406 is coupled to a speaker driver 408 with damping material. The speaker driver 408 may substantially comprise the components of speaker driver 200 described above and depicted in FIGS. 2A through 2D. The audio processor 406 is further coupled to one or more microphones 410a and 410b, which may be similar to microphones 310a and 310b described above and depicted in FIG. 3A.

The audio processor 406 is further coupled to an interface 412 for a wired or a wireless connection to the conferencing endpoint device 402. Control data is transmitted between the interface 412 and the audio processor 406 via one or more control lines 414a and 414b. CODEC data is transmitted between the interface 412 and the audio processor 406 via one or more data lines 416a and 416b. In one embodiment, the interface 412 may comprise a USB-compliant interface, such as the TAS1020B peripheral interface manufactured by Texas Instruments. In such an embodiment, the connection 404 may comprise a USB cable. Power may be provided to the speaker assembly 400 via the USB cable, or by a power supply 418. The interface 412 may also be coupled to a user interface 420 such as user interface 320 described above and depicted in FIG. 3B.

The speaker assembly 400 may optionally comprise an auxiliary audio output interface 422. As one non-limiting example, the auxiliary audio output interface 422 may comprise a port for receiving a connector to one or more speakers. The one or more speakers may be integrated with or may be external to the endpoint device 402. In some embodiments, the one or more speakers may receive audio from the speaker assembly 400 wirelessly. As another non-limiting example, the output interface may comprise a port for receiving an external headphone or earpiece. A headphone or earpiece may be advantageous for occasions when a private conversation is preferred. In some embodiments, a 3.5 mm headphone jack or a USB port may be used. In some embodiments, the headphone or earpiece may receive audio from the speaker assembly 400 wirelessly.

The speaker assembly may further include an amplifier 424. The amplifier 424 may amplify the audio signal sent to the speaker driver 408. The speaker assembly 400 may optionally include a high Z (impedance) detector 426. The high Z detector 426 may be coupled to the amplifier 424. The high Z detector may also be coupled to the auxiliary audio output interface 422.

While illustrative embodiments of the invention have been illustrated and described, it will be appreciated that various changes can be made therein without departing from the spirit and scope of the invention. It is intended that the appended claims cover all such modifications and variations as fall within the true spirit and scope of this present invention. To the extent such modifications and variations fall within the scope of the appended claims and their equivalents, they are intended to be covered by this patent.

The invention claimed is:

1. A speaker driver comprising:
 a frame,
  wherein the frame has a forward portion coupled to a surround,
  wherein the surround is coupled to a diaphragm, and
  wherein the frame has a rear portion having one or more vents;
 a damping material placed around the rear portion of the frame; and
 a regulating member adjacent to the rear portion of the frame,
  wherein the regulating member causes air to flow from behind the rear portion of the frame through the damping material and
  wherein the damping material substantially covers each of the one or more vents.

2. The speaker driver of claim 1, wherein the damping material comprises a natural material.

3. The speaker driver of claim 1, wherein the damping material comprises a synthetic material.

4. The speaker driver of claim 1, wherein the damping material comprises felt.

5. The speaker driver of claim 1, wherein the damping material comprises cotton and wool.

6. The speaker driver of claim 1, wherein the damping material is characterized by a generally circular-ring configuration.

7. The speaker driver of claim 1, wherein the damping material is characterized by a generally toroidal configuration.

8. The speaker driver of claim 1, wherein the damping material is characterized by a configuration generally following the surface of a frustum.

9. The speaker driver of claim 1, wherein the regulating member comprises paper.

10. The speaker driver of claim 1, wherein the regulating member comprises felt.

11. The speaker driver of claim 1, wherein the regulating member comprises plastic.

12. The speaker driver of claim 1, wherein the regulating member is generally annular.

13. A speaker assembly comprising:
a speaker driver, comprising a frame,
wherein the frame has a forward portion coupled to a surround,
wherein the surround is coupled to a diaphragm, and
wherein the frame has a rear portion having one or more vents; and
a damping material placed around the rear portion of the frame,
wherein the damping material substantially covers each of the one or more vents;
a regulating member adjacent to the rear portion of the frame,
wherein the regulating member causes air to flow from behind the rear
portion of the frame through the damping material and
an enclosure for housing the speaker driver.

14. The speaker assembly of claim 13, wherein the damping material comprises a natural material.

15. The speaker assembly of claim 13, wherein the damping material comprises a synthetic material.

16. The speaker assembly of claim 13, wherein the damping material comprises felt.

17. The speaker assembly of claim 13, wherein the damping material comprises cotton and wool.

18. The speaker assembly of claim 13, wherein the damping material is characterized by a generally circular-ring configuration.

19. The speaker assembly of claim 13, wherein the damping material is characterized by a generally toroidal configuration.

20. The speaker assembly of claim 13, wherein the damping material is characterized by a configuration generally following the surface of a frustum.

21. The speaker assembly of claim 13, wherein the regulating member comprises paper.

22. The speaker assembly of claim 13, wherein the regulating member comprises felt.

23. The speaker assembly of claim 13, wherein the regulating member comprises plastic.

24. The speaker assembly of claim 13, wherein the regulating member is generally annular.

25. The speaker assembly of claim 13, wherein the enclosure is substantially airtight.

26. The speaker assembly of claim 13, wherein the speaker assembly is capable of a frequency response in the range of approximately 300 Hz to approximately 19 kHz.

27. A system for audio conferencing comprising:
a conferencing endpoint device; and
a speaker assembly, comprising
a speaker driver, comprising a frame,
wherein the frame has a forward portion coupled to a surround,
wherein the surround is coupled to a diaphragm, and
wherein the frame has a rear portion having one or more vents; and
a damping material placed around the rear portion of the frame,
wherein the damping material substantially covers each of the one or more vents;
a processor coupled to the speaker driver;
a microphone coupled to the processor; and
an enclosure for housing the speaker driver, microphone, and processor;
wherein the speaker assembly is communicably coupled to the conferencing endpoint device.

28. The system of claim 27, wherein the conferencing endpoint device comprises a computer.

29. The system of claim 27, wherein the speaker assembly is communicably coupled to the conferencing endpoint device via a wireless connection.

30. The system of claim 27, wherein the speaker assembly is communicably coupled to the conferencing endpoint device via a wired connection.

31. The system of claim 27, wherein the speaker assembly is communicably coupled to the conferencing endpoint device via a USB cable.

32. A method of manufacturing a speaker driver, the method comprising the acts of:
coupling a surround to a diaphragm;
coupling the surround to a forward portion of a frame,
wherein the frame has a rear portion having one or more vents;
placing a damping material around the rear portion of the frame to substantially cover each of the one or more vents; and
placing a regulating member adjacent to the rear portion of the frame, wherein the regulating member causes air to flow from behind the rear portion of the frame through the damping material.

33. The method of claim 32, wherein the damping material comprises a natural material.

34. The method of claim 32, wherein the damping material comprises a synthetic material.

35. The method of claim 32, wherein the damping material comprises felt.

36. The method of claim 32, wherein the damping material comprises cotton and wool.

37. The method of claim 32, wherein the damping material is characterized by a generally circular-ring configuration.

38. The method of claim 32, wherein the damping material is characterized by a generally toroidal configuration.

39. The method of claim 32, wherein the damping material is characterized by a configuration generally following the surface of a frustum.

40. The method of claim 32, wherein the regulating member comprises paper.

41. The method of claim 32, wherein the regulating member comprises felt.

42. The method of claim 32, wherein the regulating member comprises plastic.

43. The method of claim 32, wherein the regulating member is generally annular.

* * * * *